(12) United States Patent
Sarkissian et al.

(10) Patent No.: US 10,488,295 B2
(45) Date of Patent: Nov. 26, 2019

(54) PNEUMATIC TEST GUN WITH SELF-ACTUATING RESTRAINING ELEMENTS

(71) Applicant: EST Group, Inc., Hatfield, PA (US)

(72) Inventors: Ka'ren Sarkissian, Langhorne, PA (US); Alex Kotlyar, Warwick, PA (US); Danko Kobziar, Lansdale, PA (US); Andrew Hall, Perkasie, PA (US); Michael Hvorecny, Kitnersville, PA (US)

(73) Assignee: EST GROUP, INC., Hatfield, PA (US)

( * ) Notice: Subject to any disclaimer, the term of this patent is extended or adjusted under 35 U.S.C. 154(b) by 157 days.

(21) Appl. No.: 15/808,451

(22) Filed: Nov. 9, 2017

(65) Prior Publication Data

US 2019/0137354 A1    May 9, 2019

(51) Int. Cl.
*G01M 3/28* (2006.01)

(52) U.S. Cl.
CPC ................................ *G01M 3/2846* (2013.01)

(58) Field of Classification Search
CPC .............................. G01M 3/28; G01M 3/2846
See application file for complete search history.

(56) References Cited

U.S. PATENT DOCUMENTS

| | | |
|---|---|---|
| 2,375,995 A | 5/1945 | Kaeser |
| 2,607,370 A | 8/1952 | Anderson |
| 3,029,630 A | 4/1962 | Cummins |
| 3,882,715 A | 5/1975 | Slinger |
| 4,381,800 A * | 5/1983 | Leslie ...................... G01N 3/12 138/90 |
| 4,385,643 A | 5/1983 | Noe |
| 4,602,500 A | 7/1986 | Kelly |
| 4,760,868 A * | 8/1988 | Saxon ................... F16L 55/136 138/89 |
| 4,924,551 A | 5/1990 | Greenbank et al. |
| 5,676,174 A | 10/1997 | Berneski, Jr. et al. |
| 5,797,431 A | 8/1998 | Adams |
| 6,035,898 A | 3/2000 | Dominguez |
| 6,966,343 B1 | 11/2005 | Field |
| 6,976,509 B1 | 12/2005 | Kirvan |

(Continued)

OTHER PUBLICATIONS

Curtiss-Wright/EST Group, "G-150 Test Gun Heat Exchanger Tube Tester", product specification sheet, Mar. 2010.

*Primary Examiner* — Nathaniel J Kolb
(74) *Attorney, Agent, or Firm* — Howson & Howson LLP

(57) ABSTRACT

A pneumatic test gun for use in performing a leak test on a tube is provided. The pneumatic test gun has a handle for being manually gripped by an operator, a distal end portion for insertion into a tube to be tested, and a proximal end plate from which the distal end portion extends and which is adapted to be abutted against an open end of the tube to be tested. The distal end portion includes a support tube providing a flow path for compressed air into a tube to be tested, a longitudinally-compressible and radially-expandable annular seal located on the support tube, and a self-activating retaining element assembly adapted for radial-expansion into engagement with an inner diameter of the tube to be tested to improve retention of the distal end portion within the tube when the tube is pressurized during a leak test. A method is also provided.

14 Claims, 4 Drawing Sheets

(56) References Cited

U.S. PATENT DOCUMENTS

2008/0216560 A1* 9/2008 Ridgway ............... G01M 3/28
73/40.5 R
2010/0083738 A1 4/2010 Padden
2015/0369689 A1* 12/2015 Kotlyar ............... G01M 3/022
73/49.8

* cited by examiner

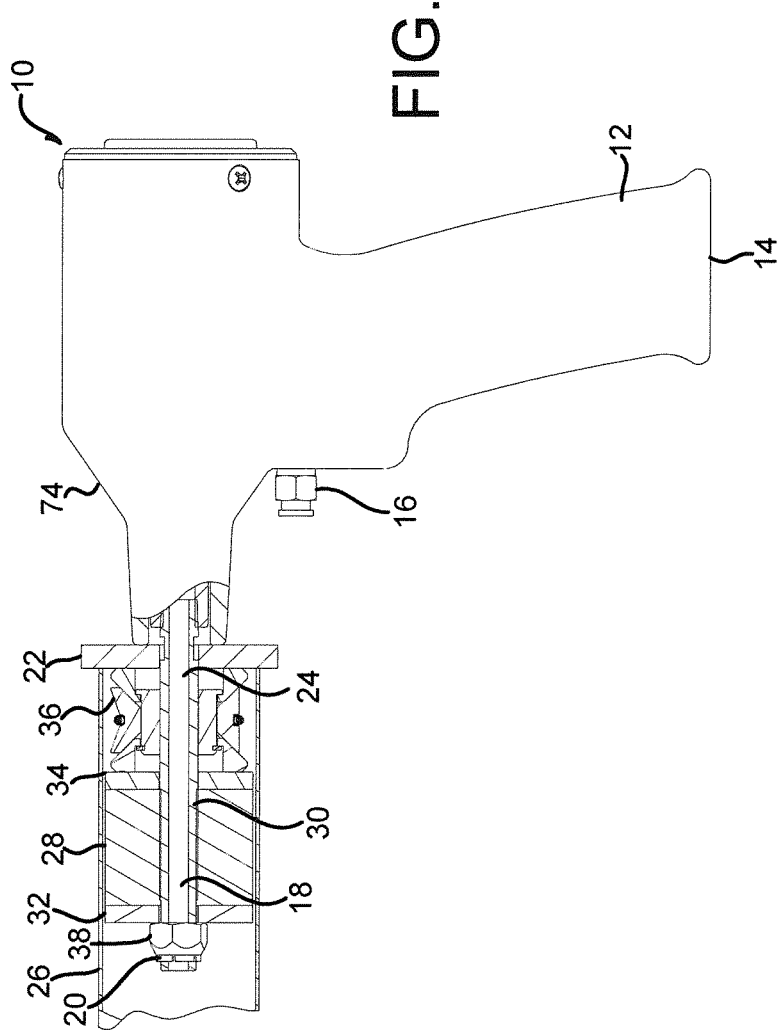

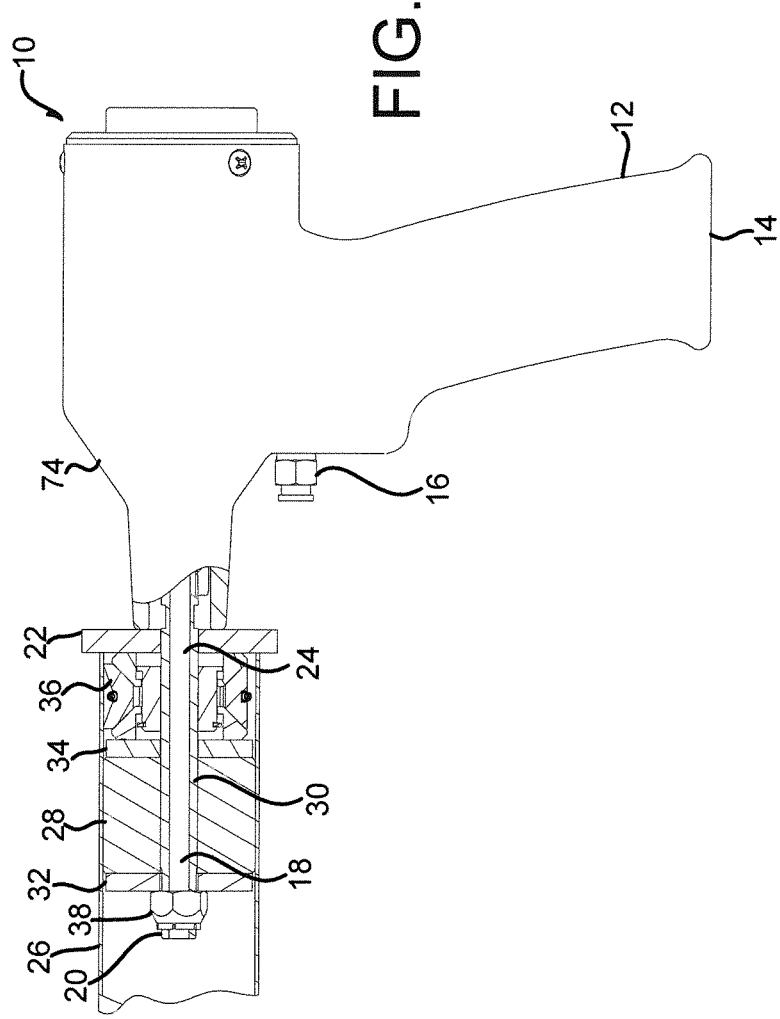

PNEUMATIC TEST GUN WITH SELF-ACTUATING RESTRAINING ELEMENTS

BACKGROUND

The present invention relates to a hand-held pneumatic tube test gun that can be used by an operator to pressure test tubes in heat exchangers.

Tube testing guns have been utilized in the heat exchanger industry. A conventional tube testing gun includes an end carrying a seal which is adapted to be inserted into an open end of a tube. The seal is expanded against the inner diameter of the tube and pressure is introduced in the tube downstream of the seal. Leaks are thereby able to be determined by monitoring pressure decay following pressurization of the tube to a pre-determined test level.

Thus, in use, a conventional tube test gun is connected to a source of compressed air and is partially inserted into one open end of a tube while a separate plugging gun or the like is inserted into an opposite open end of the tube. An air control valve on the test tube gun is manually activated by the operator to inject air into the tube to pressurize the tube. The air injected into the tube may cause or contribute to expansion of seals provided on the inserted portions of the guns into sealing engagement with the inner diameter of the tube and thereafter increase the air pressure within the tube between the seals. When the pressure in the tube stabilizes and reaches a level desired for testing purposes, the air control valve on the gun is deactivated so that air is no longer injected into the tube. Any reduction of pressure within the tube is indicated via a pressure gauge integral with the gun to reveal even the smallest of tube leaks.

The conventional tube test gun is held in place at the tube end by friction created between the expanded seal and the inner diameter of the tube and by the manual force of the operator holding the test gun at the end of the tube. Such a test gun can unintentionally slip out of a pressurized tube. When this occurs, there is a sudden decompression of the tube and release of energy adjacent the holder/operator of the test gun.

A current typical resolution of the above referenced problem and safety issue is to increase the friction force created between the seal and the inner diameter of the tube. This can be provided by using a larger actuation piston within the gun and/or by providing separate valves within the gun, one to energize the seal and a separate one to pressurize the tube. In addition, the operator may be required to exert greater pushing force on the gun throughout the duration of a test.

SUMMARY

According to an aspect of the present invention, a pneumatic test gun for use in performing a leak test on a tube to be tested is provided. The pneumatic test gun includes a handle for manual gripping of the pneumatic test gun by an operator, a distal end portion for insertion into a tube to be tested, and a proximal end plate from which the distal end portion extends and which is adapted to be abutted against an open end of a tube to be tested. The distal end portion includes a support tube providing a flow path for compressed air into a tube to be tested, a longitudinally-compressible and radially-expandable annular seal located on the support tube, and a self-activating retaining element assembly adapted to be radially-expandable into engagement with an inner diameter of a tube to be tested to improve retention of the distal end portion within the tube to be tested without deforming the inner surface of the tube.

According to another aspect of the present invention, a method of performing a leak test on a tube is provided. A distal end portion of a pneumatic tube test gun is inserted into a tube to be tested and the proximal end plate of the pneumatic tube test gun from which the distal end portion extends is held in abutment against an open end of the tube to be tested. Thereafter, a trigger mechanism is manually activated to inject compressed air through the pneumatic tube test gun and into the tube to be tested to pressurize the tube to be tested. The distal end portion of the pneumatic tube test gun includes a support tube providing a flow path for compressed air into the tube to be tested, a longitudinally-compressible and radially-expandable annular seal located on the support tube that expands into sealing engagement with an inner diameter of the tube to be tested when air is injected into the tube to be tested, and a self-activating retaining element assembly adapted to be radially-expandable into engagement with an inner diameter of the tube to be tested to retain the distal end portion of the pneumatic tube test gun within the tube to be tested.

BRIEF DESCRIPTION OF THE DRAWINGS

The foregoing and other objects, features and advantages of the embodiments disclosed herein should become apparent from the following description when taken in conjunction with the accompanying drawings.

FIG. 1 is a partial cross-sectional and elevational view of a tube test gun with a plug end of the gun inserted into an open end of a tube before the tube is pressurized according to an embodiment.

FIG. 2 is a partial cross-sectional and elevational view of a tube test gun with a plug end of the gun inserted into an open end of a tube after the tube is pressurized and as the tube is being tested according to an embodiment.

DETAILED DESCRIPTION

Figure 6:
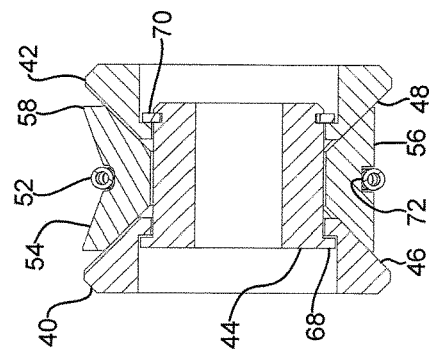
FIG. 6 is a cross-sectional view of the restraining element of FIG. 3 taken through a longitudinal axis of the restraining element.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Embodiments disclosed herein are directed to a pneumatic test gun for use in performing a leak or like test of a tube, pipe, conduit or vessel. The embodiments include self-activating restraining elements for purposes of increasing operator safety during use of the test gun and to increase the functional range (i.e., level of test pressurization) while maintaining the safety of the operator.

According to one contemplated embodiment, the pneumatic test gun is provided having a pistol-shaped, hand-held test gun configuration including a handle and barrel portion which is adapted to be at least partially inserted into an open end of a tube for performing a leak test. When the barrel portion of the gun is inserted into a tube, compressed air is forced through a central shaft of the gun by manual triggering/opening of a valve carried in the gun to cause compressed air to be injected into the interior of the tube through the barrel of the gun. As the gun is manually held in position at the open end of a tube by an operator, the gradual increase in pressure within the tube causes the seal to compress in a longitudinal direction and expand in a radial direction into sealing engagement with the inner diameter of the tube. In addition, a series of restraining elements carried on the inserted barrel portion of the gun are forced radially outward into contact with the inner diameter of the tube. In this position, the restraining elements extend to and bite into the inner diameter of the tube and maintain the inserted barrel portion of the test gun within the tube in a manner that does not damage the inside of the tube under test. In this condition, accidental slippage of the seal and test gun relative to the tube is better prevented.

According to at least some contemplated embodiments, the restraining elements contact the inner diameter of the tube at spaced-apart contact points or locations. For example, the restraining elements as a group may provide a generally triangular, hexagonal, or other geometric shape in elevational view such that the restraining elements as a group only contact the inner diameter of the tube at six, three, or other number of pre-determined spaced-apart points or locations. Of course, more or less points or other geometrical shapes may be utilized.

A pneumatic test gun 10 according to an illustrated embodiment is shown in FIGS. 1 and 2. The pneumatic test gun 10 includes a handle 12 for being gripped by the hand of a user or operator when manually operating the pneumatic test gun 10. The pneumatic test gun 10 is adapted to be connected to a source of compressed air, for instance, via a connection (not shown) at the base 14 of the handle 12 or any other location on the pneumatic test gun 10. A finger-operated trigger mechanism 16 or the like may be provided adjacent the handle 12 so that the user or operator can depress the trigger mechanism 16 to open a valve (not shown) contained within the housing of the pneumatic test gun 12 to permit the compressed air to pass through defined flow paths within the pneumatic test gun 10 and into a tube or pipe being tested.

The so-called "barrel" portion 18 of the pneumatic test gun 10 has a distal end 20 and a washer or end plate 22 or like element at a proximal end 24 of the barrel portion 18. When the barrel portion 18 of the pneumatic test gun 10 is inserted into the open end of a tube to be tested, such as tube 26 shown in FIG. 1, the washer or end plate 22 is forced to abut against the end of the tube 26 under the manual force of the operator holding the handle 12 of the pneumatic test gun 10.

An annular seal 28, such as an elastomeric seal or the like, is mounted on a central support tube 30 which extends longitudinally through the barrel portion 18 and which defines a flow path for compressed air to be injected into the tube 26 being tested from the pneumatic test gun 10. The annular seal 28 is mounted between distal and proximal annular plates, 32 and 34, such as steel washers or the like, which are also mounted on the support tube 30. A self-activating restraining element assembly 36 is also mounted on the support tube 30 and is located between the proximal annular plate 34 and the end plate 22. A nut or like fastener 38 maintains the distal and proximal annular plates 32 and 34, the annular seal 28, and the restraining element assembly 36 on the centrally-extending support tube 30 between the nut 38 and end plate 22.

During use of the pneumatic test gun 10, compressed air can be caused to flow through the pneumatic test gun 10 as discussed above, through the support tube 30, and into the tube 26 downstream of the distal end 20 of the barrel portion 18 of the pneumatic test gun 10. As air pressure increases within tube 26, the pressure exerts a force against the distal annular plate 32 to reduce the distance separating the distal annular plate 32 and the proximal annular plate 34 and to reduce the distance separating the proximal annular plate 34 and the end plate 22. As this occurs, the annular seal 28 is compressed between the distal and proximal annular plates 32 and 34 and caused to expand in a radial direction into sealing engagement with the inner diameter of the tube 26 thereby sealing the end of the tube 26 to permit further pressurization of the tube 26. In addition to the seal 28 being longitudinally-compressed and radially-expanded by relative movement of distal and proximal annular plates, 32 and 34, the restraining element assembly 36 is also longitudinally-compressed and radially-expanded by relative movement of the proximal annular plate 34 and the end plate 22.

According to an embodiment, the restraining element assembly 36 includes a pair of opposed cone-shaped supports, 40 and 42, interconnected by an inner support sleeve 44 extending over the support tube 30. The cone-shaped supports, 40 and 42, provide an opposed pair of tapered walls, 46 and 48, on which a multi-segment restraining element 50 is supported, rides and is able to slide between radially-expanded and radially-contracted positions. The multi-segment restraining element 50 is held to and against the tapered walls, 44 and 48, by an annular spring 52, spring clip, or like element.

As the cone-shaped supports 40 and 42 are forced to move closer together when proximal annular plate 32 moves toward the stationary end plate 22, the multi-segment restraining element 50 is caused to slide or ramp "up" the tapered walls, 46 and 48, such that the multi-segment restraining element 50 expands in a radially outward direction. For instance, see FIG. 2 compared with FIG. 1.

Thus, the force of the air pressure within the tube 26 automatically forces and thereafter retains the multi-segment restraining element 50 into locking engagement with the inner diameter of the tube 26 thereby "biting" into the tube 26 and retaining the barrel portion 18 of the pneumatic test gun 10 within the tube 26. The greater the pressure within the tube 26, the greater the force that the multi-segment restraining element 50 is applied into engagement with the inner diameter of the tube 26. Accordingly, when the tube 22 is pressurized to the pre-determined test pressure, the pneumatic test gun 10 is held in place in the sealed end of the tube 26 by the self-acting multi-segment restraining element 50 and less force is required by the operator to hold the pneumatic test gun 10 during a leak test procedure.

The above discussed self-actuation of the multi-segment restraining element 50 improves operator safety and provides benefits with respect to not requiring any additional time to set the restraining elements and with respect to ensuring that the operator does not accidentally forget to set the elements or set the elements improperly. In addition, the multi-segment restraining element 50 permits the use of higher test pressures and enables the pneumatic test gun to be used when the inner diameter of the tube being tested may be wet with water, oils, or other substance that might otherwise reduce friction between the seal 28 and the tube 26.

A pressure gauge or like mechanism (not shown) may be integrally formed or mounted on the pneumatic test gun 10 to enable a decay in pressure within the tube to be monitored over a period of time during a leak test. Alternatively, other electronic mechanisms or the like could be used with the gun 10 to provide this function.

One contemplated embodiment of a self-activating restraining element assembly 36 is shown in FIGS. 3-6 in a longitudinally-expanded, radially-retracted condition. This is the condition in which the barrel portion 18 of the pneumatic test gun 10 may be readily inserted into or removed from an open end of a tube or pipe. The term "retracted position" refers to the position of the multi-segment restraining element 50 being retracted radially toward the support sleeve 44 so that the multi-segment restraining element 50 is free of significant contact with the inner diameter of a tube to be tested.

Figure 5:
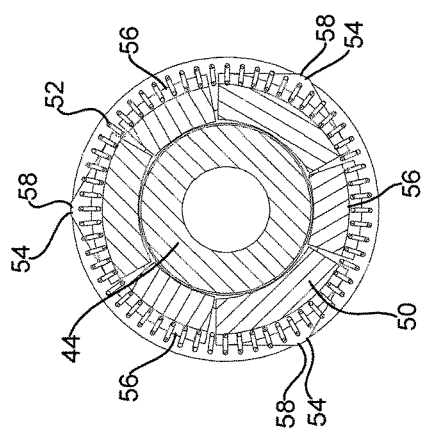
FIG. 5 is a cross-sectional view of the restraining element of FIG. 3 taken adjacent the circumferentially-extending spring of the restraining element.
Figure 4:
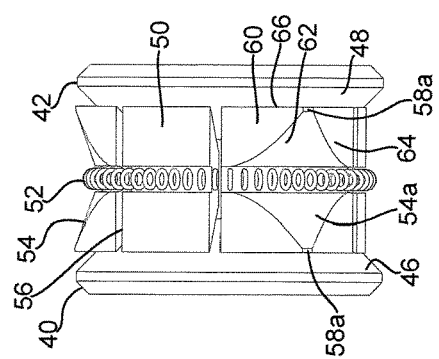
FIG. 4 is a side elevational view of the restraining element of FIG. 3.
Figure 3:
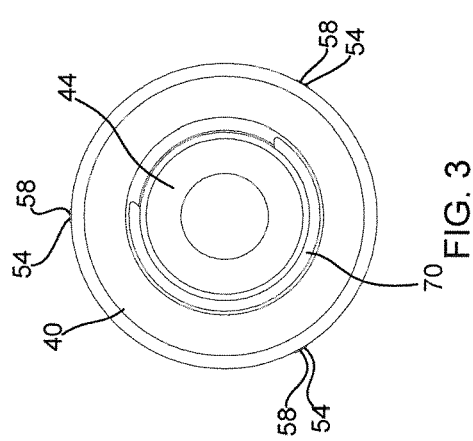
FIG. 3 is a front elevational view of a restraining element of the tube test gun in a retracted position according to an embodiment.
Figure 10:
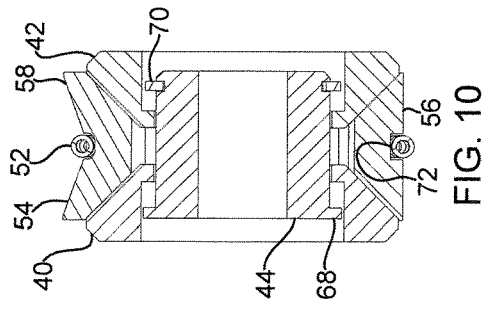
FIG. 10 is a cross-sectional view of the restraining element of FIG. 7 taken through a longitudinal axis of the restraining element.
Figure 9:
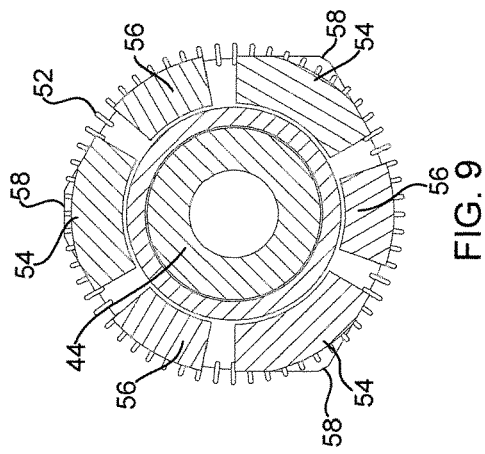
FIG. 9 is a cross-sectional view of the restraining element of FIG. 7 taken adjacent the circumferentially-extending spring of the restraining element.
Figure 8:
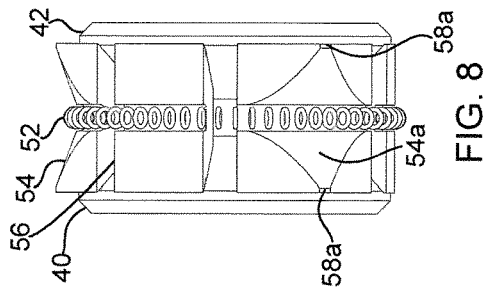
FIG. 8 is a side elevational view of the restraining element of FIG. 7.
Figure 7:
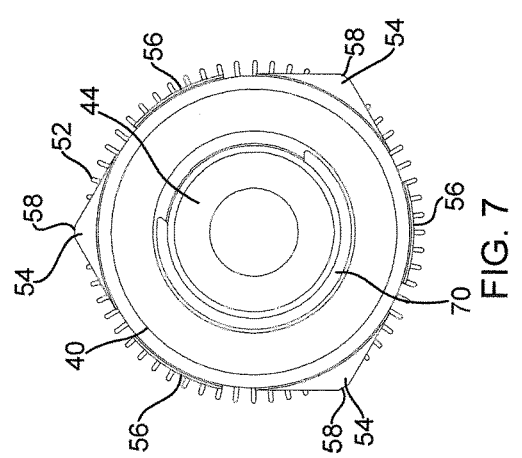
FIG. 7 is a front elevational view of the restraining element of FIG. 3 in an expanded position.

As best shown in FIG. 5, the multi-segment restraining element 50 may include three restraining element segments 54 and three spacer segments 56 retained on the cone-shaped supports, 40 and 42, by the spring 52 in an alternating pattern. Each of the restraining element segments 54 includes a pair of contact points or teeth 58 that are adapted to contact and engage the inner diameter of a tube to be tested. For instance, see FIG. 4 which shows a restraining element segment 54*a* having a pair of contact points or teeth 58*a* located on opposite sides of the spring 52. Each tooth is formed by three angled walls, 60, 62 and 64, and a side wall 66 and the contact point 58*a* is located at the apex of the tooth.

In contrast to the restraining element segments 54, the spacer segments 56 merely space the restraining element segments 54 apart and are not configured to be able to extend to a position to contact the inner diameter of the tube. However, in the position shown in FIGS. 3-6, the spacer segments 54 are adapted to contact the support sleeve 44. See FIG. 6. As also best shown in FIG. 6, the cone-shaped supports, 40 and 42, are captured on the support sleeve 44 via an outturned flanged edge 68 at one end of the support sleeve 44 and a retaining ring 70 applied at an opposite end of the support sleeve 44.

FIGS. 7-10 show the condition of the self-activating restraining element assembly 36 when the cone-shaped supports, 40 and 42, are caused to be moved together as discussed above. In this condition, the contact points 58 of the restraining element segments 54 engage and bite into the inner diameter of the tube to be tested. Thus, the restraining element assembly 36 only contacts the inner diameter of the tube at six points (i.e., two contact points 58 for each restraining element segment 54).

As illustrated, each of the restraining element and spacer segments, 54 and 56, may include a circumferentially-extending groove 72 on an outer surface thereof in which the spring 52 is seated and extends.

While FIGS. 3-10 illustrate one contemplated embodiment of the configuration of a self-activating restraining element assembly 36, other configurations are also contemplated. For instance, the number and shape of the restraining element and spacer segments may be varied and the pattern in which these segments are arranged may be varied. In addition, all the segments may be provided as restraining elements segments which include at least one contact point. Accordingly, the assembly could be provided with any desired number of segments and contact points, for instance two to twenty or more. In addition, the contact points or peaks may be enlarged such that contact is provided continuously along an arc segment of the inner diameter of the tube or as an arc segment that is serrated providing a series of teeth. Still further, each restraining element segment may provide only one contact point or may provide multiple contact points.

Further, with respect to the support tube 30, it may be adapted to retract into the head section 74 of the pneumatic gun 10 as pressure is increased within the tube to be tested. In this case, the distal annular plate 32 would move toward the stationary end plate 22 in unison with the end of the support tube 30 while the proximal annular plate 34 slides relative to the support tube 30 and while a proximal end of the support tube slides through the stationary end plate 22. Of course, other arrangements may be provided. For instance, the arrangement of the seal and the self-activating retaining element assembly may be reversed such that the relative positions of the self-activating retaining element assembly and seal on the barrel portion of the gun are switched.

The foregoing description and specific embodiments are merely illustrative of the principles thereof, and various modifications and additions may be made to the apparatus by those skilled in the art, without departing from the spirit and scope of this invention.

We claim:

1. A pneumatic test gun for use in performing a leak test on a tube to be tested, comprising:
   a handle for manual gripping of the pneumatic tube test gun;
   a distal end portion for insertion into a tube to be tested; and
   a proximal end plate from which said distal end portion extends and which is adapted to be abutted against an open end of a tube to be tested;
   said distal end portion including a support tube providing a flow path for compressed air into said tube to be tested, a longitudinally-compressible and radially-expandable annular seal located on said support tube, and a retaining element assembly adapted to be radially-expandable into engagement with an inner diameter of said tube to be tested to retain said distal end portion within the tube to be tested
   wherein said retaining element assembly includes a multi-segmented retaining element extending circumferentially about said support tube;
   wherein said multi-segmented retaining element includes at least two separate retaining element segments;
   wherein said multi-segmented retaining element includes at least two spacer element segments in an alternating arrangement with said retaining element segments.

2. The pneumatic test gun according to claim 1, further comprising distal and proximal annular plates mounted on said support tube such that said proximal annular plate is located between said distal annular plate and said proximal end plate, wherein one of said annular seal and said retaining element assembly is located between said distal and proximal annular plates, and the other one of said annular seal and said retaining element assembly is located between said proximal annular plate and said proximal end plate.

3. The pneumatic test gun according to claim 2, wherein relative movement of said distal annular plate toward said proximal end plate causes said annular seal to longitudinally-compress and radially-expand, and relative movement of said proximal annular plate toward said proximal end plate causes radial-expansion of said retaining element assembly.

4. The pneumatic test gun according to claim 1, wherein each of said retaining element segments includes at least one tooth providing a contact point when said multi-segmented retaining element engages an inner diameter of said tube to be tested.

5. The pneumatic test gun according to claim 4, wherein each tooth provides a contact point formed at the apex of at least three tapered walls.

6. The pneumatic test gun according to claim 1, further comprising a pair of supports mounted on said support tube and having opposed tapered support walls on which said multi-segmented retaining element is mounted such that relative movement of the pair of supports toward each other causes said multi-segmented retaining element to slide on said opposed tapered walls to a more radially outward position.

7. The pneumatic test gun according to claim 6, further comprising a circumferentially extending spring that retains said multi-segmented retaining element on said opposed tapered support walls, wherein each element of said multi-segmented retaining element has a circumferentially extending groove on an outer surface thereof in which said spring is seated.

8. The pneumatic test gun according to claim 7, wherein said multi-segmented retaining element includes at least two retaining element segments, wherein each of said retaining element segments include at least two radially-outward-most contact points adapted to be engaged with an inner diameter of a tube to be tested, and wherein two of said contact points of each segment are on opposite sides of said spring.

9. The pneumatic test gun according to claim 1, further comprising a manually operated trigger mechanism on or adjacent said handle for enabling compressed air to flow through the pneumatic tube test gun.

10. The pneumatic test gun according to claim 1, further comprising a head section which interconnects said handle to said distal end and into which said support tube can be retracted when said distal annular plate is caused to move toward said proximal end plate.

11. A method of performing a leak test on a tube, comprising:
  inserting a distal end portion of a pneumatic test gun into a tube to be tested;
  wherein the pneumatic test gun comprises:
    a handle for manual gripping of the pneumatic tube test gun; and
    a proximal end plate from which said distal end portion extends and which is adapted to be abutted against an open end of said tube to be tested;
    said distal end portion including a support tube providing a flow path for compressed air into said tube to be tested, a longitudinally-compressible and radially-expandable annular seal located on said support tube, and a retaining element assembly adapted to be radially-expandable into engagement with an inner diameter of said tube to be tested to retain said distal end portion within the tube to be tested;
    wherein said retaining element assembly includes a multi-segmented retaining element extending circumferentially about said support tube;
    wherein said multi-segmented retaining element includes at least two separate retaining element segments;
    wherein said multi-segmented retaining element includes at least two spacer element segments in an alternating arrangement with said retaining element segments;
  holding said pneumatic test gun such that said proximal end plate of the pneumatic test gun from which said distal end extends abuts against an open end of the tube to be tested; and
  manually activating a trigger mechanism to inject compressed air through the pneumatic test gun and into the tube to be tested to pressurize the tube to be tested
  wherein during the injection of compressed air into the tube to be tested, relative movement of a distal annular plate of the distal end portion towards said proximal end plate of the distal end portion causes the annular seal to longitudinally-compress and radially-expand into sealing engagement with the inner diameter of the tube to be tested and relative movement of the proximal annular plate toward the proximal end plate causes radial-expansion of the retaining element assembly into retaining engagement with the inner diameter of the tube to be tested;
  monitoring a pressure decay of the tube to be tested;
  concluding that there is a leak in the tube to be tested if said pressure decay exceeds a predetermined test level.

12. The method according to claim 11, wherein each of the retaining element segments includes at least one tooth providing a contact point where the multi-segmented retaining element engages an inner diameter of the tube to be tested, and wherein each tooth provides a contact point formed at the apex of at least three tapered walls.

13. The method according to claim 11, further comprising a pair of supports mounted on the support tube of the pneumatic test gun and having opposed tapered support walls on which the multi-segmented retaining element is mounted such that relative movement of the pair of supports toward each other causes the multi-segmented retaining element to slide on the opposed tapered walls to a more radially outward position.

14. The method according to claim 11, wherein during the injection of compressed air into the tube to be tested, the support tube of the distal end portion of the pneumatic test gun automatically retracts at least partially into a head section of the pneumatic test gun.

* * * * *